United States Patent
Tsengas

(10) Patent No.: US 7,921,814 B1
(45) Date of Patent: Apr. 12, 2011

(54) NATURAL COLLAGEN PET CHEW AND NUTRIENT AND FLAVOR AGENT DELIVERY METHOD

(75) Inventor: Steven Tsengas, Fairport Harbor, OH (US)

(73) Assignee: Ourpet's Co., Fairport Harbor, OH (US)

( * ) Notice: Subject to any disclaimer, the term of this patent is extended or adjusted under 35 U.S.C. 154(b) by 621 days.

(21) Appl. No.: 11/958,502

(22) Filed: Dec. 18, 2007

Related U.S. Application Data

(60) Provisional application No. 60/883,352, filed on Jan. 4, 2007.

(51) Int. Cl.
*A01K 29/00* (2006.01)

(52) U.S. Cl. ........................................ 119/710

(58) Field of Classification Search .................. 119/710, 119/709, 711; 426/805
See application file for complete search history.

(56) References Cited

U.S. PATENT DOCUMENTS

| | | | |
|---|---|---|---|
| 1,149,170 A | 8/1915 | Allis | |
| 3,891,334 A | 6/1975 | Loikitz | |
| 4,294,753 A * | 10/1981 | Urist | 530/395 |
| 4,364,925 A * | 12/1982 | Fisher | 424/50 |
| 4,427,583 A * | 1/1984 | England et al. | 530/420 |
| 4,674,444 A | 6/1987 | Axelrod | |
| 5,275,954 A * | 1/1994 | Wolfinbarger et al. | 436/74 |
| 5,897,893 A * | 4/1999 | Mohilef | 426/89 |
| 5,912,285 A | 6/1999 | Godsey | |
| 6,178,922 B1 | 1/2001 | Denesuk et al. | |
| 2002/0044888 A1* | 4/2002 | Morris et al. | 422/33 |
| 2004/0025803 A1* | 2/2004 | Sherrill et al. | 119/710 |

* cited by examiner

*Primary Examiner* — Yvonne R. Abbott
(74) *Attorney, Agent, or Firm* — John D. Gugliotta, PE, Esq.

(57) ABSTRACT

A method of producing an enriched, natural collagen pet chew by means of vacuum sealing impregnation technology to add nutrients, flavoring, and/or anti-microbial agents to a natural, but demineralized, canine bone chew. A pet mastication article is soaked in acetic acid to reveal a flexible, chewable collagen structure. After the collagen structure is soaked and rinsed, nutrients and other agents are infused into the porous structure of the bone by means of vacuum impregnation.

14 Claims, No Drawings

NATURAL COLLAGEN PET CHEW AND NUTRIENT AND FLAVOR AGENT DELIVERY METHOD

RELATED APPLICATIONS

The present application is a Continuation of U.S. Ser. No. 60/883,352 filed on Jan. 4, 2007. The present application claims a benefit to that priority date and it incorporates all of the subject matter of ('352) as if it is fully rewritten herein.

BACKGROUND OF THE INVENTION

1. Field of the Invention

The present invention relates generally to a method of producing an enriched, natural collagen pet chew and, more specifically, to a vacuum sealing impregnation technology that adds nutrients, flavoring, and/or anti-microbial agents to a natural, but demineralized, bone that is intended to be chewed by a domesticated animal.

2. Description of the Related Art

There is a plurality of pet chews specifically adapted for domesticated animals and pet use. These chews generally include ones made from either or both natural and artificial materials. Many pets prefer a use of natural materials, such as bone and rawhide, to provide them with a proper combination of protein, nutrients and other flavors; however, natural bones and rawhide can cause a number of hazards to animals chewing on them. These hazards vary from a cracking of teeth on bones to a choking on bone or hide fragments. The use of natural materials can also cause risks to the animal itself. To overcome these hazards, most providers of such materials commutate the rawhide and reconstitute it through a process which controls a manner in which it degrades during chewing.

The most common method to administer nutritional supplements or medication to canines is to give them vitamins, i.e., nutrition supplements and/or medications in pill-form. The manufacturing process does not accommodate an incorporation of such supplements in most commutated, reconstituted rawhide chews. The pill is most often forced into a pet's mouth or it is hidden in the pet's food to disguise both an unpleasant taste and a resulting chalkiness associated it. Each of these methods can be difficult to perform, and oftentimes, they can be dangerous when the pet is stubborn or difficult. As a result, many pet owners have sought an effective means of supplementing their pet's nutritional needs in a safe, efficient and pleasing manner.

A search of the prior art did not disclose any patents that read directly on the claims of the instant invention; however, the following references are considered related:

U.S. Pat. No. 1,149,170, issued in the name of Allis, discloses an animal toy made of a pliable material that is impregnated with a tasty substance along its exterior surface;

U.S. Pat. No. 3,891,334, issued in the name of Loikitz, discloses a pet chew toy formed from a polyamide substrate, such as NYLON®, wherein the substrate is formed into a shape that is attractive to a pet, such as a bone, and wherein the formed article is impregnated with flavor and odor properties by placement of the article into a pressure cooker containing the impregnation solution, the article being cooked at 210°-290° F. and at a pressure of 15-60 psi;

U.S. Pat. No. 4,674,444, issued in the name of Axelrod, discloses a pet chew toy having a layer of caramelized sugar impregnated onto the toy by immersing the toy into an aqueous solution of sugar and cooking at a temperature between 80°-300° C. and at a pressure of 30 psi, and wherein the toy is manufactured from water absorbent nylon;

U.S. Pat. No. 5,897,893, issued in the name of Mohilef, discloses a pet chew having an edible tubular wrapper, and a method of making, wherein the chew toy has a bone core with an outer tubular wrapper placed around and shrinking the bone core;

U.S. Pat. No. 5,912,285, issued in the name of Godsey, discloses a chew toy having a vegetable based flavoring and scent additive, wherein thermoplastic pellets are mixed with a vegetable based flavoring and scent additive and the toy is formed by injection molding; and U.S. Pat. No. 6,178,922, issued in the name of Denesuk et al., discloses a tough chew resistant material formed in a shape that is attractive to a pet, wherein an anti-microbial agent is bound to the chew material.

Each of the aforementioned patents suffer from several shortcomings or drawbacks including a failure to disclose a method for making a pet mastication product manufactured by a vacuum impregnation of nutrients and anti-microbial agents. Vacuum impregnation of raw bones, in particular, is highly desirable because pets are attracted to such bones; a highly effective method of administering nutrients and anti-microbial agents is provided.

Consequently, there exists a continuous need for new ideas and enhancements for existing products in the pet mastication product industry.

SUMMARY OF THE INVENTION

It is therefore an object of the present invention to provide a means of making a mastication device for domesticated animals by demineralizing bones formed of natural collagen.

It is another object of the present invention to provide a means of adding nutrients, flavoring and/or anti-microbial agents to the demineralized, natural collagen mastication device.

It is a feature of the present invention to provide a means of impregnating a raw bone with a nutrient, flavoring and/or anti-microbial agents.

Briefly described according to one embodiment of the present invention, a pet mastication article is formed of demineralized bones in which acetic acid or another demineralizing agent solvates and dispaces the calcium in a natural bone, thus leaving only the natural collagen structure. Anti-microbial agents, flavoring and other suitable ingredients that enhance the flavor and the healthy properties of the pet mastication article are vacuum infused into the article to effectively deliver the desirable nutrients to pets. The nutrients, anti-microbial agents, flavorings and other properties are impregnated by vacuum impregnation technology, wherein these agents and properties are effectively sealed into the pet mastication article and released upon use of the article by a pet.

BRIEF DESCRIPTION OF THE DRAWINGS

There are no figures that accompany this specification.

DESCRIPTION OF THE PREFERRED EMBODIMENTS

The best mode for carrying out the invention is presented in terms of its preferred embodiment described below.

A nutrient and an anti-microbial agent delivery method comprises, generally, the nutrients, anti-microbial agents, flavor enhancements and other gustatory properties attractive to pets vacuum impregnated to a pet mastication article. It is envisioned that the pet mastication article may have a variety of forms, including bones, chew toys of varying styles, qualities, sizes and appearances, or other suitable articles used by pets for play and for a strengthening of teeth.

It is envisioned that a plurality of nutrients may be provided, including any or all of the vitamins and minerals required by daily dietary proscriptions for particular breeds of pet. It is also envisioned that a plurality of combinations may be provided, including combinations sensitive to those pets susceptible to bladder stones caused by the over-absorption of dietary vitamins and minerals, s.a., an over-absorption of calcium and/or Vitamin C.

The pet mastication article includes anti-microbial agents provided to effectively combat microbial infestation that can cause illness and/or disease and contribute to the overall degradation of a pet's health. A variety of anti-microbial agents may be provided, either separately or in various combinations.

It is envisioned that the pet mastication article is soaked in acetic acid to reveal the flexible, chewable collagen structure. After the collagen structure is soaked and rinsed, nutrients and other agents are infused into the porous structure of the bone by means of vacuum impregnation. The pet mastication articles have a porous body, wherein the pores are open cells having a micro-porosity on the order of between 3 and 10 microns.

It is envisioned that a plurality of flavorings and other gustatory enhancements are available for use in combination with the pet mastication article and the nutrients and/or anti-microbial agents provided therein. The flavorings may include meat-based flavorings appealing to pets, or sweet tasting flavors also appealing to pets, such as peanut butter or various flavors of puddings or gelatins.

An alternative method to impregnations is a soaking of the demineralized bones in a bath of a liquid comprising flavoring, supplements, preservatives, etc. In water, the collagen bones expand, or bloat, to expose holes or the cavities that the minerals used to occupy. A wicking action fills these voids.

A gel liquid may be used to hold the filler in place. It is anticipated that the demineralized bone may be soaked in the liquid or it may alternatively be vacuum impregnated in place. In either method, the final product is spun to remove excess material and air. It may alternatively or also be oven dried before packaging.

The foregoing descriptions of specific embodiments of the present invention are presented for purposes of illustration and description. They are not intended to be exhaustive nor to limit the invention to the precise forms disclosed, and obviously, many modifications and variations are possible in light of the above teaching. The embodiments are chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and to their equivalents. Therefore, the scope of the invention is to be limited only by the following claims.

What is claimed is:

1. A method of producing a pet mastication article comprising the steps of:
   placing natural bone material into a solution of acetic acid;
   soaking said bone material until calcium and other minerals are removed, wherein only a natural collagen structure is substantially left;
   applying an enriching agent to said pet mastication article; and,
   vacuum sealing said enriching agent to said pet mastication article through micro-pores formed in said pet mastication article.

2. The method of claim 1, wherein said enriching agent is a dietary vitamin.

3. The method of claim 1, wherein said enriching agent is a dietary mineral.

4. The method of claim 1, wherein said enriching agent is an anti-microbial agent to combat microbial agents that cause disease and illness.

5. The method of claim 1, wherein said enriching agent is a flavor enhancer.

6. The method of claim 1, wherein said soaking is accomplished in a bath of a liquid comprising flavoring, supplements and preservatives such that said bone expands and bloats in water to expose said micropores that said minerals used to occupy.

7. The method of claim 1, further comprising a step of soaking said demineralized bone in a gel fluid to hold said enriching agent in place.

8. The method of claim 1, further comprising a step of spinning excess material and air off said bone before packaging.

9. The method of claim 1, further comprising a step of oven drying said bone before packaging.

10. A pet mastication article manufactured by the method of claim 1.

11. A method of producing a pet mastication article comprising the steps of:
    placing natural bone material into a solution of acetic acid;
    soaking said bone material until calcium and other minerals are removed, wherein only a natural collagen structure is substantially left;
    applying an enriching agent to said pet mastication article; and,
    soaking said demineralized bone in a gel fluid to hold said enriching agent to said pet mastication article through micro-pores formed in said pet mastication article.

12. The method of claim 11, further comprising a step of spinning excess material and air off said bone before packaging.

13. The method of claim 11, further comprising a step of oven drying said bone before packaging.

14. A pet mastication article manufactured by the method of claim 11.

* * * * *